(12) United States Patent
Kolli et al.

(10) Patent No.: US 10,250,688 B2
(45) Date of Patent: Apr. 2, 2019

(54) METHOD AND APPARATUS FOR TRANSMITTING SENSOR DATA IN A WIRELESS NETWORK

(71) Applicant: CANON KABUSHIKI KAISHA, Tokyo (JP)

(72) Inventors: Yacine El Kolli, Rennes (FR); Patrice Nezou, Saint Sulpice la Foret (FR)

(73) Assignee: Canon Kabushiki Kaisha, Tokyo (JP)

(*) Notice: Subject to any disclaimer, the term of this patent is extended or adjusted under 35 U.S.C. 154(b) by 55 days.

(21) Appl. No.: 14/727,542

(22) Filed: Jun. 1, 2015

(65) Prior Publication Data
US 2015/0350329 A1 Dec. 3, 2015

(30) Foreign Application Priority Data
Jun. 3, 2014 (GB) .................................. 1409825.5

(51) Int. Cl.
*H04L 29/08* (2006.01)
*H04W 12/06* (2009.01)
(Continued)

(52) U.S. Cl.
CPC ............ *H04L 67/12* (2013.01); *H04L 67/325* (2013.01); *H04L 69/28* (2013.01); *H04W 4/006* (2013.01);
(Continued)

(58) Field of Classification Search
CPC ........ H04L 67/12; H04L 67/325; H04W 4/06; H04W 12/06; H04W 28/06; H04W 28/26; H04W 72/12; H04W 84/18; H04W 84/20
See application file for complete search history.

(56) References Cited

U.S. PATENT DOCUMENTS 4,847,835 A * 7/1989 Le Lann ............... H04L 12/413
370/447
6,674,259 B1 * 1/2004 Norman ................. A63H 11/00
318/567
(Continued)

FOREIGN PATENT DOCUMENTS

EP 1513367 A2 3/2005
JP 2009-060480 A 3/2009

*Primary Examiner* — Blake J Rubin
(74) *Attorney, Agent, or Firm* — Canon U.S.A., Inc. IP Division (57) ABSTRACT

The present invention concerns a method and a device for transmitting sensor data in a wireless network. The network is based on a shared transmission channel. Access to the shared transmission channel is scheduled by the master node. The slave node comprises an acquisition device producing said data. The method comprises on the slave node: obtaining a request for acquiring data from the master node; estimating the value of a time information representative of a delay for the acquisition device to acquire a block of data ready for transmission; sending a message to the master node comprising the estimated time information; receiving an authorization of transmission from the master node, said authorization of transmission being scheduled at a time depending on the estimated time information; and transmitting a block of data to the master node after said reception according to the received authorization. Accordingly, the communication channel is reserved at the right time allowing minimizing the bandwidth and the latency.

12 Claims, 8 Drawing Sheets

(51) Int. Cl.
  *H04W 4/38* (2018.01)
  *H04W 4/00* (2018.01)
  *H04L 29/06* (2006.01)
  *H04W 84/20* (2009.01)
  *H04W 28/06* (2009.01)
  *H04W 28/26* (2009.01)
  *H04W 72/12* (2009.01)
  *H04W 84/18* (2009.01)

(52) U.S. Cl.
  CPC ............ *H04W 4/38* (2018.02); *H04W 12/06* (2013.01); *H04W 28/06* (2013.01); *H04W 28/26* (2013.01); *H04W 72/12* (2013.01); *H04W 84/18* (2013.01); *H04W 84/20* (2013.01)

(56) References Cited

U.S. PATENT DOCUMENTS

| | | | | |
|---|---|---|---|---|
| 9,390,369 | B1* | 7/2016 | Sinyavskiy | G06N 3/049 |
| 2004/0015079 | A1* | 1/2004 | Berger | A61B 8/546 |
| | | | | 600/437 |
| 2005/0276318 | A1* | 12/2005 | Bokhour | G01S 13/76 |
| | | | | 375/219 |
| 2006/0165026 | A1* | 7/2006 | Apneseth | G05B 19/414 |
| | | | | 370/322 |
| 2006/0171410 | A1* | 8/2006 | Jung | H04L 12/40143 |
| | | | | 370/447 |
| 2007/0010898 | A1* | 1/2007 | Hosek | G05B 19/4148 |
| | | | | 700/2 |
| 2007/0208678 | A1* | 9/2007 | Matsugu | G06N 3/049 |
| | | | | 706/18 |
| 2008/0252445 | A1* | 10/2008 | Kolen | G08B 21/0446 |
| | | | | 340/539.16 |
| 2008/0273527 | A1* | 11/2008 | Short | H04J 3/0655 |
| | | | | 370/364 |
| 2009/0164638 | A1* | 6/2009 | Jang | H04W 72/10 |
| | | | | 709/226 |
| 2009/0168796 | A1* | 7/2009 | Pandey | H04W 72/02 |
| | | | | 370/458 |
| 2009/0222589 | A1* | 9/2009 | Kirsch | G04G 5/00 |
| | | | | 709/248 |
| 2009/0323716 | A1* | 12/2009 | Chintalapudi | H04W 74/0841 |
| | | | | 370/461 |
| 2010/0148940 | A1* | 6/2010 | Gelvin | H04L 67/12 |
| | | | | 340/286.02 |
| 2010/0305767 | A1* | 12/2010 | Bengtson | F03D 7/047 |
| | | | | 700/287 |
| 2011/0211461 | A1* | 9/2011 | Bahr | H04W 74/0891 |
| | | | | 370/245 |
| 2012/0020336 | A1* | 1/2012 | Bahr | H04W 74/02 |
| | | | | 370/336 |
| 2012/0140861 | A1* | 6/2012 | Menon | B60T 7/18 |
| | | | | 375/356 |
| 2012/0263190 | A1* | 10/2012 | Umehara | H04J 3/0635 |
| | | | | 370/458 |
| 2014/0324974 | A1* | 10/2014 | Park | H04W 72/02 |
| | | | | 709/204 |
| 2014/0371905 | A1* | 12/2014 | Eberst | B25J 9/1664 |
| | | | | 700/253 |
| 2015/0369924 | A1* | 12/2015 | Hedgecock | G01S 5/0072 |
| | | | | 342/357.34 |
| 2017/0041897 | A1* | 2/2017 | Pitigoi-Aron | H04W 56/0045 |

* cited by examiner

METHOD AND APPARATUS FOR TRANSMITTING SENSOR DATA IN A WIRELESS NETWORK

This application claims the benefit under 35 U.S.C. § 119(a)-(d) of United Kingdom Patent Application No. 1409825.5, filed on Jun. 3, 2014 and entitled "Method and apparatus for transmitting sensor data in a wireless network". The above cited patent application is incorporated herein by reference in its entirety.

FIELD OF THE INVENTION

The present invention concerns a method and a device for transmitting sensor data in a wireless network. It is particularly suited for a robotic system where a mobile robot head is wirelessly transmitting raw image or video data to a main station using a plurality of fixed wireless stations located around the robot.

BACKGROUND OF THE INVENTION

A typical robot system is made of one controller, at least one sensor and at least one actuator. The sensor is read by the controller and the value of the sensor is used by the controller to compute a new value to write in the actuator. The sensor is used to capture physical properties around a zone of interest. The physical properties can be temperature, pressure and even images. The sensor is responsible to convert the physical properties into digital values and send this sensor information to the controller. The actuator is a motor used to control a mechanism and change the physical environment. The actuators are controlled by the robot controller typically to move the robot arms. An example of such system is detailed in FIG. 1 below.

The communication between the robot controller and the sensors can be advantageously implemented by wireless communication. The main advantage of wireless communication is to save cost regarding the wiring of the robot frame. The wireless communication can be advantageously implemented by using the 60 Ghz frequency band allowing to achieve multi gigabit throughput hence allowing very low latency high resolution image transfer. The scheduled protocols for wireless channel access control are best suited for the robot wireless communication implementation. Only these protocols can guaranty channel access timing which is the very basis of any real time higher level protocol. Image sensor control must be implemented by higher level real time protocols. The scheduled protocols, like TDMA (Time Division Multiple Access) for example, set a master node in charge of defining access time slots for all the nodes and it includes mechanisms for any node to claim and release access to the time slots. The master is in charge of managing wireless transmission time slots. Slaves cannot send wireless frames unless previously instructed by the master to do so.

These systems are real time systems where the latency between the moment when the controller asks for information from a sensor and the moment it receives the sensor information should be kept as short as possible.

The communication being wireless, as in all wireless transmission system, the available bandwidth is always a valuable resource. In consequence, especially in the case where the size of the sensor information is important as, for example, for image capture sensors, the bandwidth consumption of the transmission should also be kept as small as possible.

The problem is therefore to determine a scheduled transmission protocol for the command and the transmission of sensor data under these two constraints.

The present invention has been devised to address one or more of the foregoing concerns.

SUMMARY OF THE INVENTION

According to a first aspect of the invention there is provided a method for transmitting data from a slave node to a master node in a network, said network being based on a shared transmission channel, access to the shared transmission channel being scheduled by the master node, the slave node comprising an acquisition device producing said data, the method comprising on the slave node: obtaining a request for acquiring data from the master node; estimating the value of a time information representative of a delay for the acquisition device to acquire a block of data ready for transmission; sending a message to the master node comprising the estimated time information; receiving an authorization of transmission from the master node, said authorization of transmission being scheduled at a time depending on the estimated time information; and transmitting a block of data to the master node after said reception according to the received authorization. Accordingly, the communication channel is reserved at the right time allowing minimizing the bandwidth and the latency.

In an embodiment, the method further comprises estimating an updated value of the time information; sending a message to the master node comprising the updated estimated time information; receiving an updated authorization of transmission from the master node, said updated authorization of transmission being scheduled at a time depending on the updated estimated time information. Accordingly, the time of reservation of the communication channel may be adapted dynamically to changes in the actual times of capturing data.

In an embodiment, estimating the value of a time information representative of a delay for the acquisition device to acquire a block of data ready for transmission comprises: estimating the actual acquisition of data by the acquisition device; estimating the time for converting acquired values from the analog domain to the digital domain; estimating the time of the actual delivery of data to a module responsible for packing the data into a format suitable for the network transport; and estimating the time for data buffering in said module responsible for packing the data. Accordingly the prediction is adapted to data acquisition sensors.

According to another aspect of the invention there is provided a method for transmitting data from a slave node to a master node in a network, said network being based on a shared transmission channel, access to the shared transmission channel being scheduled by the master node, the slave node comprising an acquisition device producing said data, the method comprising on the master node: sending a request for acquiring data to the slave node; obtaining a message from the slave node comprising a time information representative of a delay for the acquisition device to acquire a block of data ready for transmission; determining an authorization of transmission scheduled at a time depending on the received time information; sending said authorization of transmission to the slave node; obtaining a block of data from the slave node after according to the sent authorization of transmission. Accordingly, the communication channel is reserved at the right time allowing minimizing the bandwidth and the latency.

In an embodiment, the method further comprises: obtaining a message from the slave node comprising an updated time information; determining an updated authorization of transmission scheduled at a time depending on the updated time information; and sending said updated authorization of transmission to the slave node. Accordingly, the time of reservation of the communication channel may be adapted dynamically to changes in the actual times of capturing data.

According to another aspect of the invention there is provided a device acting as a slave node for transmitting data to a master node in a network, said network being based on a shared transmission channel, access to the shared transmission channel being scheduled by the master node, the slave node comprising an acquisition device producing said data, the device comprising: means for obtaining a request for acquiring data from the master node; means for estimating the value of a time information representative of a delay for the acquisition device to acquire a block of data ready for transmission; means for sending a message to the master node comprising the estimated time information; means for receiving an authorization of transmission from the master node, said authorization of transmission being scheduled at a time depending on the estimated time information; and means for transmitting a block of data to the master node after said reception according to the received authorization. Accordingly, the communication channel is reserved at the right time allowing minimizing the bandwidth and the latency.

In an embodiment, the device further comprises: means for estimating an updated value of the time information; means for sending a message to the master node comprising the updated estimated time information; means for receiving an updated authorization of transmission from the master node, said updated authorization of transmission being scheduled at a time depending on the updated estimated time information. Accordingly, the time of reservation of the communication channel may be adapted dynamically to changes in the actual times of capturing data.

In an embodiment, the device comprises for estimating the value of a time information representative of a delay for the acquisition device to acquire a block of data ready for transmission: means for estimating the actual acquisition of data by the acquisition device; means for estimating the time for converting acquired values from the analog domain to the digital domain; means for estimating the time of the actual delivery of data to a module responsible for packing the data into a format suitable for the network transport; and means for estimating the time for data buffering in said module responsible for packing the data. Accordingly the prediction is adapted to data acquisition sensors.

According to another aspect of the invention there is provided a device acting as a master node for receiving data from a slave node in a network, said network being based on a shared transmission channel, access to the shared transmission channel being scheduled by the master node, the slave node comprising an acquisition device producing said data, the device comprising: means for sending a request for acquiring data to the slave node; means for obtaining a message from the slave node comprising a time information representative of a delay for the acquisition device to acquire a block of data ready for transmission; means for determining an authorization of transmission scheduled at a time depending on the received time information; means for sending said authorization of transmission to the slave node; means for obtaining a block of data from the slave node after according to the sent authorization of transmission. Accordingly, the communication channel is reserved at the right time allowing minimizing the bandwidth and the latency.

In an embodiment, the device further comprises: means for obtaining a message from the slave node comprising an updated time information; means for determining an updated authorization of transmission scheduled at a time depending on the updated time information; means for sending said updated authorization of transmission to the slave node. Accordingly, the time of reservation of the communication channel may be adapted dynamically to changes in the actual times of capturing data.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which.

BRIEF DESCRIPTION OF THE DRAWINGS

DETAILED DESCRIPTION OF EMBODIMENTS OF THE INVENTION

The invention concerns the transmission of data from a slave node to a master node in a network. The considered networks are typically based on a shared transmission channel. Access to the shared transmission channel may be based on several kind of arbitration. We focus on networks where access to the transmission channel is scheduled over time by a predetermined node in the network called the master node. Namely, the master node decides of the time where slave nodes connected to the network have access to the shared transmission channel. The master node is therefore responsible for giving authorization of transmission to slave nodes.

We also focus on slave nodes comprising an acquisition device, typically a sensor. The master node manages the acquisition of data by sensors according to its need. Data acquired by the sensor should then be transmitted to the master node. In the detailed embodiment described below, the sensor is an image acquisition device and data acquired by the sensor are images that should be transmitted to the master node. But, the invention would work the same for any kind of acquisition device.

In a first step, the master node sends a request for acquisition of data to the slave node. When the slave node receives this request, it estimates the value of a time information representative of a delay to acquire a block of data ready for transmission. The slave node sends a message to the master node comprising this estimated time information. The master node determines an authorization of transmission scheduled at a time depending on the received time information and sends this authorization to the slave node. The slave nodes then sends a block of data acquired from the sensor at a time according to this authorization.

It may happen that the estimation of the acquisition time should be updated, for example when the exposure time of an image sensor depends on external factors like the ambient light. Accordingly, in some embodiments, the slave node may estimate an updated value of the time information. This updated time information is sent to the master node. The master node determines an updated authorization of transmission scheduled according to this updated time information and sends it to the slave node. The slave node then uses this updated authorization for the sending of the data to be transmitted.

Typically the estimation of the time information is based on an estimation of the actual acquisition of data by the acquisition device; the time for converting acquired values from the analog domain to the digital domain; the time of the actual delivery of data to a module responsible for packing the data into a format suitable for the network transport; and estimating the time for data buffering in said module responsible for packing the data.

A detailed embodiment will now be described.

Figure 1:
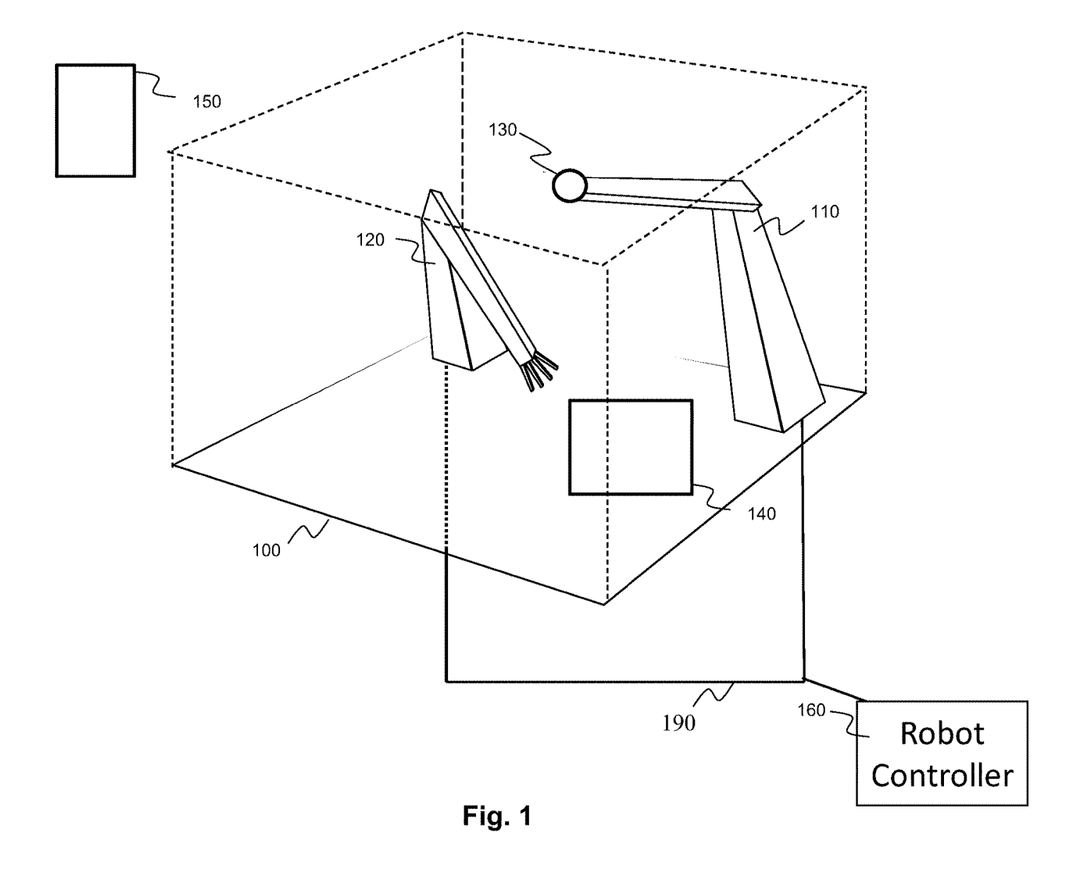
FIG. 1 illustrates an embodiment of the typical robot platform.

FIG. 1 illustrates an embodiment of the typical robot platform. In this system there are two wireless sensors (130, 150) and two wired actuators (110, 120). The first actuator 120 is driven by the robot controller 160 through wire link 190 for executing assembly work on the device 140. The robot controller 160 performs scene image analysis to refine the working arm 120 motion. A first wireless sensor 150 is set to take images of the global scene and a second wireless sensor 130 is mounted on a second robot arm 110. An example of robot cycle is described in the following. The robot controller 160 first reads the first image sensor 150 to get a picture of the global scene. Next, the robot controller 160 analyses the image of the global scene and calculates a motion for the vision arm 110 to get the second sensor 130 closer to the assembly spot. Next, the robot controller 160 sends commands to the second actuator 110 to bring the second sensor 130 closer to the region previously calculated. Next, the robot controller 160 reads the second image sensor 130 to get a close picture of the assembly spot. Next, the robot controller 160 analyses the image of the assembly spot and calculate motion and action for the working arm 120. Finally, the robot controller 160 sends commands to the first actuator 120 for actual assembly work.

In this system, considering a scheduled wireless transmission system like TDMA, the master function is advantageously assigned to the robot controller 160 as it is the only node to be constantly powered on. While the wireless image sensors (130,150) are running the slave function.

Figure 2:
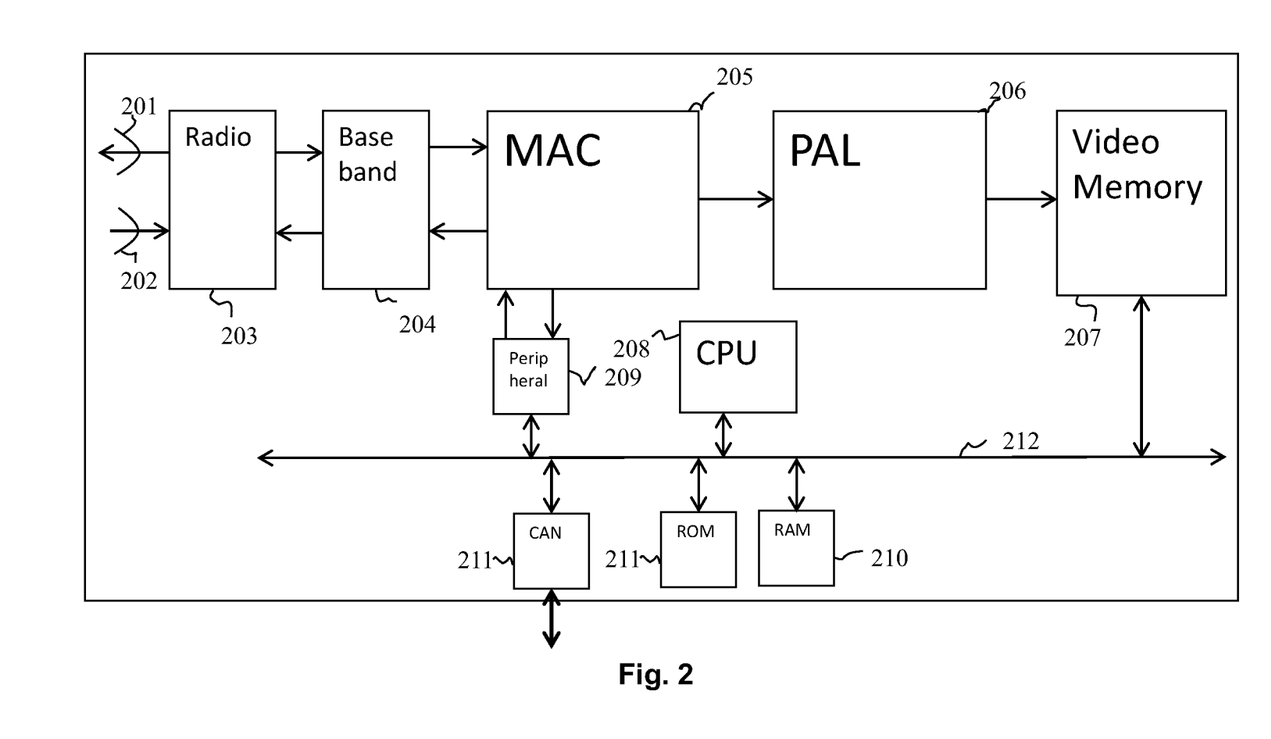
FIG. 2 illustrates an embodiment of the internal architecture of the robot controller.

FIG. 2 illustrates an embodiment of the internal architecture of the robot controller. The robot controller 160 in FIG. 1 embeds a video memory 207 for image reception from the PAL module 206 and for image processing by the CPU 208. The PAL module 206 is responsible for pixel data extraction from MAC packets and image generation in the video memory 207. The MAC module 205 sends and receives wireless packets to and from the base band processor 204. Another function of the MAC module 205 is to master the access to the radio channel. The MAC module 205 is responsible to define access time slots for all slave devices. The base band processor performs modulation and demodulation of data according to the radio front end 203. The radio front end 203 sends radio signals by using the transmission antenna 201 and receives radio signals by from the reception antenna 202.

MAC module 205 and PAL module 206 can be implemented as software modules in one or several standard processing devices or as one or several specific processing devices such as ASICs (Application Specific Integrated Circuit).

The robot controller 160 is controlled and configured by a processor subsystem comprising a processor (CPU) 208 connected through a system bus 212 to a ROM storage 211 and a RAM storage 210 and to a peripheral controller 209 able to read and write MAC module 205 registers and to send and receive control words to and from the wireless image sensors. The processor has access to a CAN (Controller Area Network) interface module 211 for the control of the actuators 120 and 100 of FIG. 1.

Figure 3:
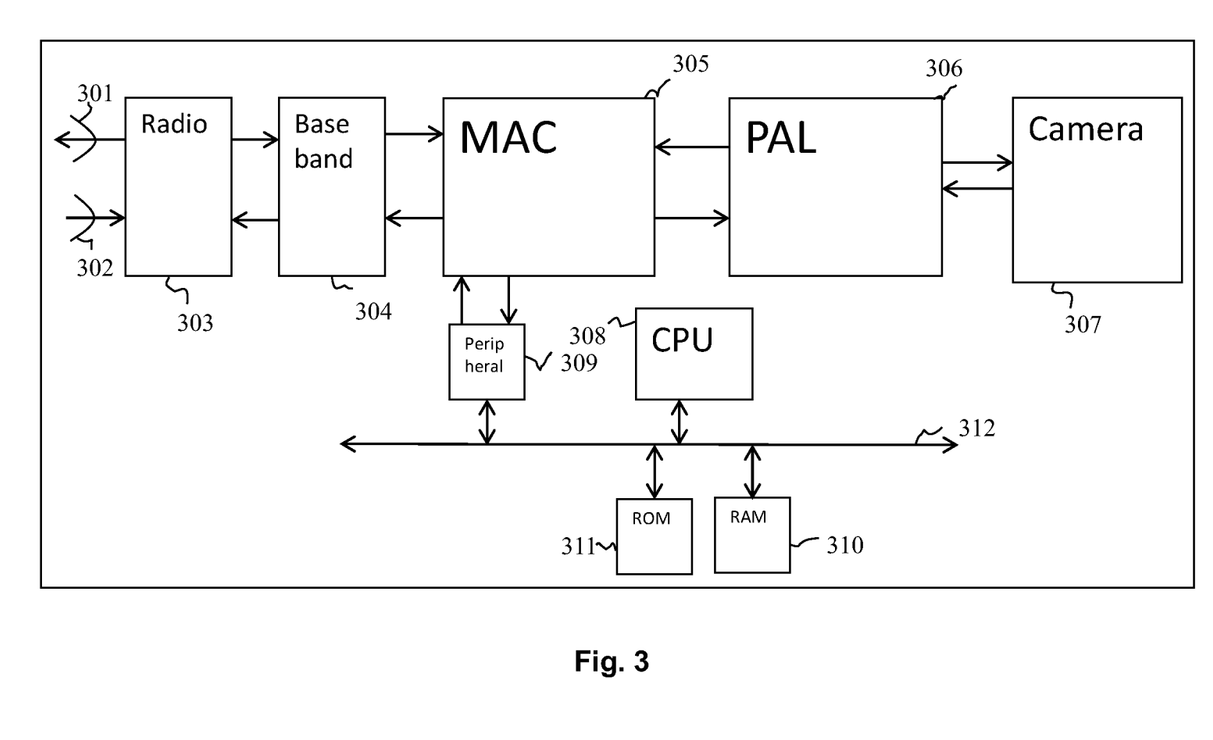
FIG. 3 illustrates an embodiment of the architecture of the wireless image sensor.

FIG. 3 illustrates an embodiment of the architecture of the wireless image sensor 130/150 in FIG. 1. The wireless image sensor 130/150 embeds an image sensor 307 for example compliant to the Camera Link standard defined by the AIA machine vision trade association. The image sensor 307 is connected to a PAL module 306. The PAL module is responsible for pixel data packing into a format suitable for the network transport. The PAL module sends packed pixel data to the MAC module 305. The PAL module also sends start of image and first pixel received indications to the MAC module 305. The MAC module 305 sends and receives wireless packets to and from the base band processor 304. The MAC module 305 sends wireless packets only when instructed to do so by the robot controller MAC module 205. The base band processor performs modulation and demodulation of data according to the radio front end 303. The radio front end 303 sends radio signals by using the transmission antenna 301 and receives radio signals by from the reception antenna 302.

MAC module 305 and PAL module 306 can be implemented as software modules in one or several standard processing devices or as one or several specific processing devices such as ASICs.

The wireless image sensor 130/150 is controlled and configured by a processor subsystem comprising a processor 308 connected through a system bus 312 to a ROM storage 311 and a RAM storage 310 and to a peripheral controller 309 able to read and write MAC module 305 registers.

Figure 4:
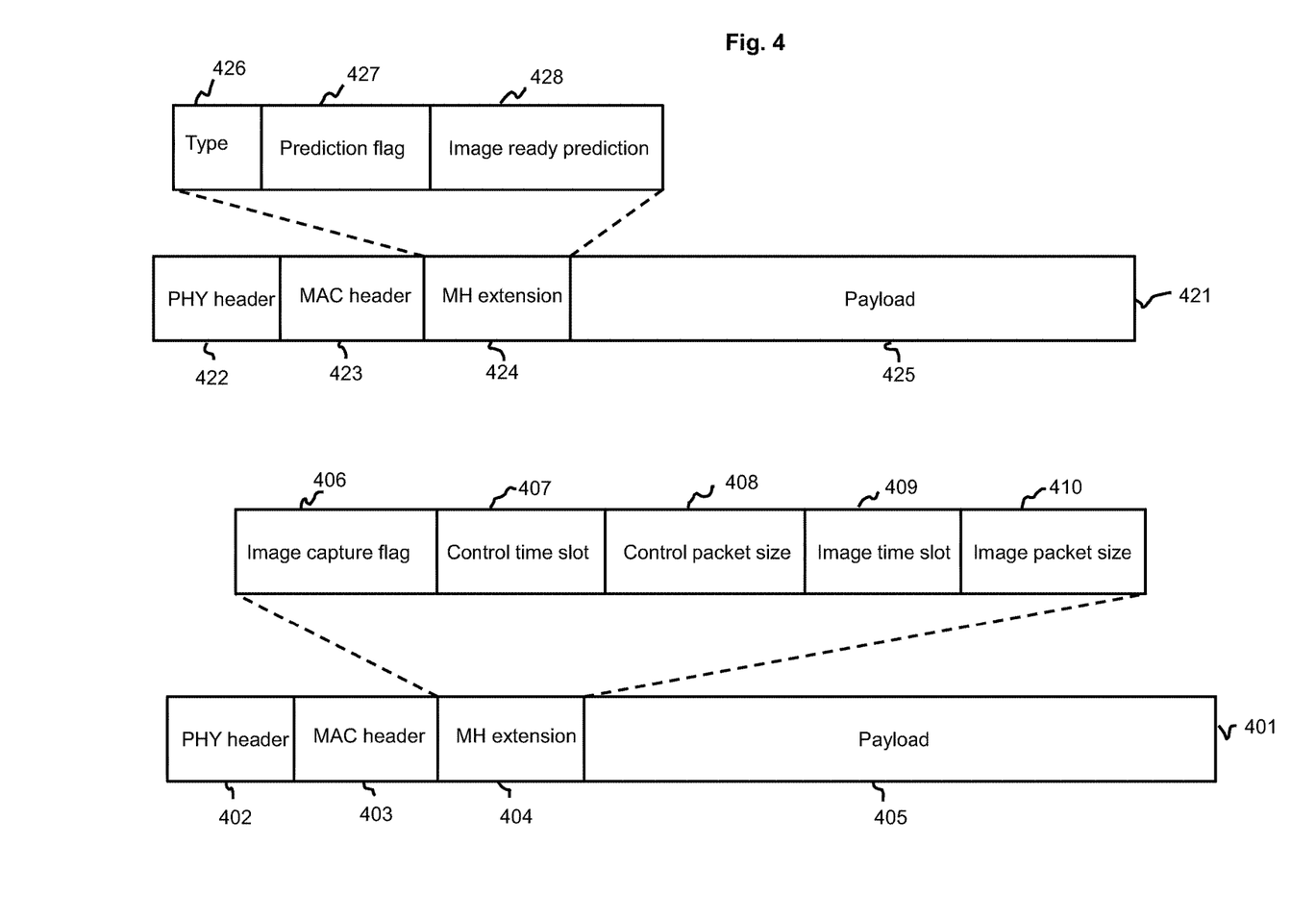
FIG. 4 illustrates an embodiment of the wireless packet format.

FIG. 4 illustrates an embodiment of the wireless packet format. The robot controller 160 sends wireless packets 401 including a PHY header 402 containing information relative to the physical layer. These packets may for example be the ones defined in the standard 802.15.3c. The packet contains also a MAC header 403 containing link layer information like for example the ones defined in the standard 802.5.3c. It also contains a MAC header extension field 404 specifically used by the invention embodiment and a payload field 405. The payload field contains control words for image sensor configuration such as image parameters or timings or sensor commands and status such as start exposure or turn light on.

The MAC header extension 404 contains an image capture flag 406. When set to one this flag indicates that the payload 401 includes a command for starting the image sensor exposure. Otherwise the flag is set to 0. The MAC header extension 404 contains a control time slot 407 field. The master (robot controller 160) sets relative time for the next control transmission for the receiving slave (wireless image sensor). The MAC header extension 404 contains a control packet size 408 field. The master (robot controller 160) sets the packet size for the next control transmission for the receiving slave (wireless image sensor). The MAC header extension 404 contains an image time slot 409 field. The master (robot controller 160) sets relative time for the next image block transmission for the receiving slave (wireless image sensor). The MAC header extension 404 contains also an image packet size 410 field. The master (robot controller 160) sets the packet size for the next image block transmission for the receiving slave (wireless image sensor).

The image sensors (130/150) send wireless packets 421 including a PHY header 422 containing information relative to the physical layer, like for example the ones defined in the standard 802.15.3c. The packet also contains a MAC header 423 containing link layer information like for example the ones defined in the standard 802.5.3c. The packet also contains a MAC header extension field 424 specifically used for the invention embodiment and a payload filed 425. The payload field contains either control words such as sensor command feedback or image block data.

The MAC header extension 424 contains a Type field 426. If the type field is set to 0 then the payload 425 contains control data. If the Type field is set to 1 then the payload 425 contains image block data. The MAC header extension 424 also contains a prediction flag 427. If the prediction flag is set to 0 then it means that the next field contains no prediction. If the prediction field is set to 1 then it means that the next field contains a prediction. If the field is set to 2 then it means that the next field contains an updated prediction. The MAC header extension 424 also contains an Image ready prediction field 428. This field contains the time prediction for the wireless image sensor to be ready to send the first image data block.

Figure 5:
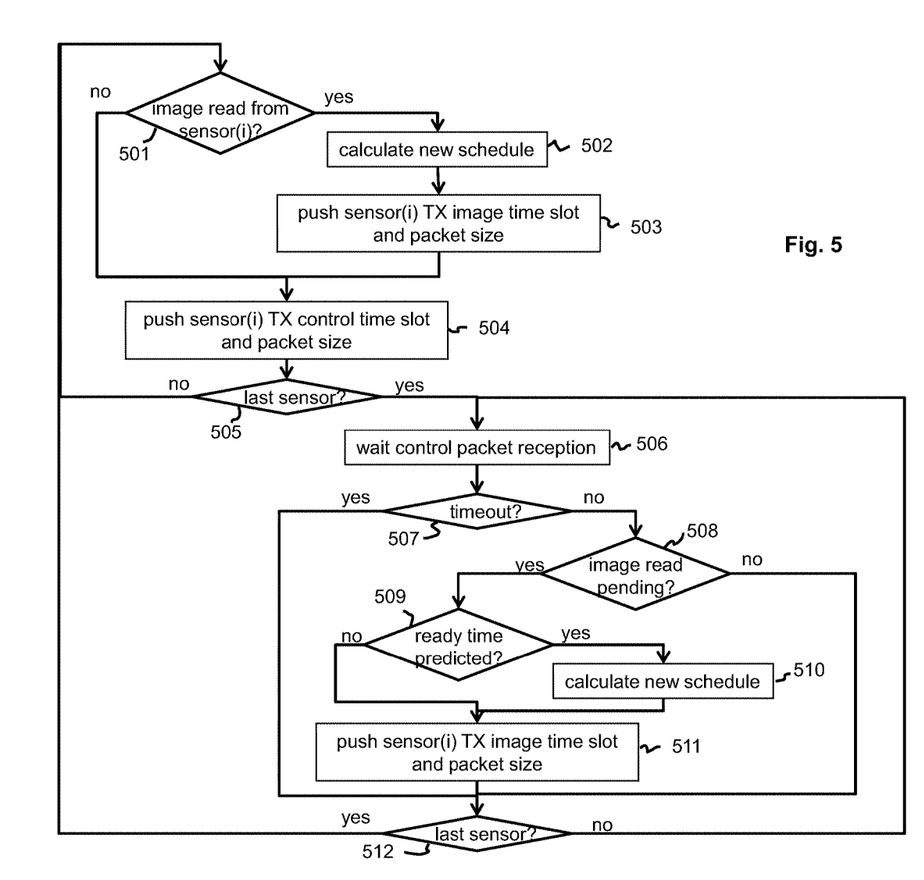
FIG. 5 illustrates an embodiment of the algorithm followed by the robot controller MAC module 205 for time slot assignment.

FIG. 5 illustrates an embodiment of the algorithm followed by the robot controller MAC module 205 for time slot assignment of the slave devices (wireless image sensors).

In a first step 501 the MAC module checks if the CPU has sent a start sensor exposure command to the current image sensor. If no then the MAC module executes directly the step 504.

If yes then in step 502 the MAC module will calculate a new schedule for slave packets sending including a new image transfer.

Then during step 503 the MAC module will set the Image Time slot field 409 for the first image block packet to be sent by the current image sensor. Also the associated Image packet size field 410 is set and the field Image Capture Flag 406 is set to one.

During the step 504 the MAC module will set the Control Time slot field 409 for the next control block packet to be sent by the current image sensor. Also the associated Control packet size field 410 is set. The control packet is then sent to the slave.

Next the current image sensor index in incremented and during the test 505 the MAC module checks if it has already processed the CPU commands for all the sensors. If no then the MAC modules loops back to the step 501.

When all the CPU commands have been processed, the MAC module will wait for control packet reception from the current image sensor device during the step 506.

During the step 507 the MAC module checks if a timeout occurred while waiting. If yes then the MAC module executes directly the step 512.

If no then the MAC module has received a control packet from the current image sensor. So during the test 508 the MAC module will check if an image acquisition is pending for the current image sensor. If no then the MAC module executes directly the step 512.

If an image acquisition is pending then during the test 509 the MAC module will check the MAC extension header field 427 for a time prediction (either first prediction or updated prediction).

If there is a time prediction then during the step 510 the MAC module will read the value of the prediction in the MAC extension header field 428 and calculate a new time schedule based on this prediction.

Then during the step 511 then MAC module will set the Image Time slot field 409 for the first image block packet to be sent by the current image sensor. Also the associated Image packet size field 410 is set. If there was no time predicted the MAC module will use the value calculated during the step 502.

Then during the step 512 the MAC module checks if it has treated the last image sensor available. If no then the MAC module returns to the step 506 for control packet reception from the next image sensor. If yes then the MAC module loops back to the initial step 501 for commands processing from the robot controller CPU.

Figure 6:
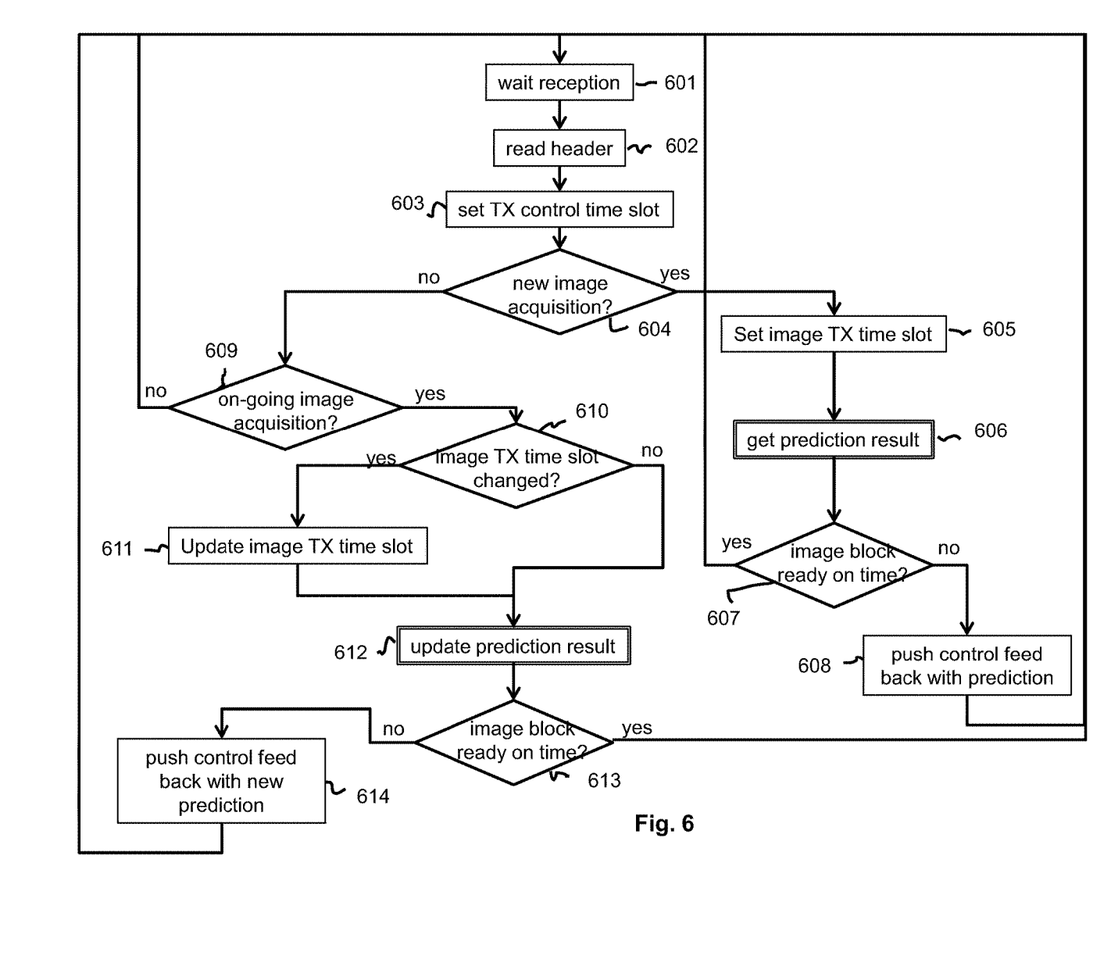
FIG. 6 illustrates an embodiment of the algorithm followed by the wireless image sensor MAC module 305 for time slot following.

FIG. 6 illustrates an embodiment of the algorithm followed by the wireless image sensor MAC module 305 for the determination and the negotiation of the time slots indications received from the robot controller MAC module.

During an initial step 601 the MAC modules waits for a control packet reception from the robot controller.

When the control packet is received, during the step 602 the MAC module reads the MAC extension header 404 of FIG. 4 contained in the control packet.

Next, during the step 603 the MAC module schedules itself to prepare the transmission of the next control packet transmit slot at a time determined according to the values read in the fields 407 and 408 respectively Control Time Slot and Control Packet Size.

Next, during the step 604 the MAC module will test the field 406 Image Capture Flag. If it has the value 0 then this control packet does not start a new image capture and the MAC module will execute the step 610 as described later in this description.

If the Image Capture Flag 406 has the value 1 then this control packet starts a new image capture by the wireless image sensor. So during the step 605 the MAC module schedules itself for the transmission of the first image block packet in the transmit slot according to the values read in the fields 409 and 410 respectively Image Time Slot and Image Packet Size.

Then during the step 606 the MAC module will calculate a prediction on when it will be ready for the first image block transmission knowing the packet size instructed by the robot controller MAC. This step of prediction is further detailed with respect of FIG. 7 description.

Then during the step 607 the MAC module analyzes the result of the prediction with respect to the image time slot instructed by the robot controller. If the MAC module determines that it will be ready just on time for the image time slot then there are no further actions to take and the MAC module loops back to the initial step 601.

If the MAC module finds that the prediction does not match the image time slot instruction (either lower or greater) then during the step 608 the MAC module informs the robot controller of its prediction by writing the extension header fields 427 and 428 respectively Prediction Flag set to 1 and Image ready Prediction with the value of the prediction. This information will be sent to the robot controller at the next Control Time Slot as processed during the step 603. Then the MAC module returns to the initial step 601.

Back to the step 604, if the control packet received does not indicate a new image acquisition, then during the test 609 the MAC module checks if an image acquisition is already started in this wireless image sensor. If no then there is no more processing to do and the MAC module resumes to the initial step 601.

If yes then the MAC module executes the test 610 to check whether the robot controller has changed the Image time slot allocation compared to the previous control packets received.

If yes then the MAC module schedules itself for the transmission of the next control packet at the transmit slot determined according to the values read in the fields 407 and 408 respectively Control Time Slot and Control Packet Size. Then the MAC module executes the step 612.

If the Image time slot is the same then during the step 612 the MAC module will update its prediction with respect to the times slot and packet size instruction from the robot controller and also with respect to the ongoing image acquisition timings. This step of updated prediction is detailed in the description of the FIG. 8.

Next, during the step 613 the MAC module analyzes the result of the updated prediction with respect to the image time slot instructed by the robot controller. If the MAC module finds that it will be ready just on time for the image time slot then there are no further actions to take and the MAC module loops back to the initial step 601.

If the MAC module finds that the updated prediction does not match the image time slot instruction (either lower or greater) then during the step 614 the MAC module will inform the robot controller of its updated prediction by writing the extension header fields 427 and 428 respectively Prediction Flag set to 2 and Image ready Prediction with the value of the updated prediction. This information will be sent to the robot controller at the next Control Time Slot as processed during the step 603. Then the MAC module resumes to the initial step 601.

Figure 7:
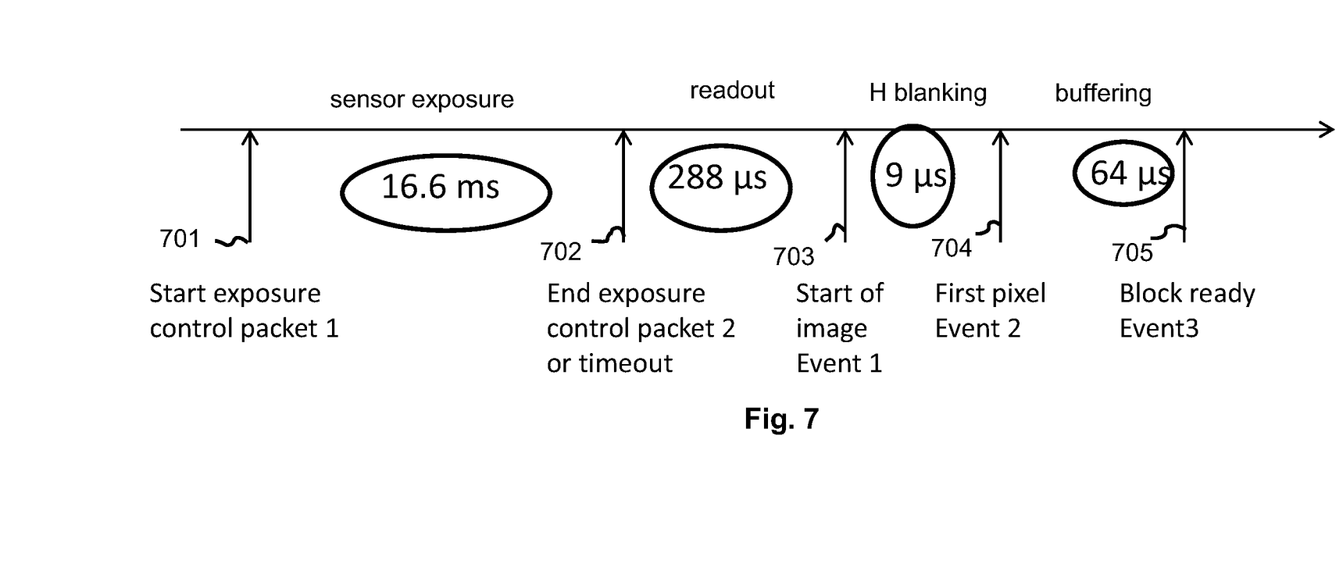
FIG. 7 illustrates an embodiment of the wireless image sensor prediction means.

FIG. 7 illustrates an embodiment of the wireless image sensor prediction means. It illustrates the complete timing of an image capture on the wireless image sensor from the reception of first control packet with the Image Capture Flag 406 set to 1 (701, accordingly step 605 on FIG. 6) to the first image block ready to be sent 705. An image capture on the wireless image sensor starts with the reception of the command to start the exposure 701. The robot controller sends this command, a wireless control packet. This packet is converted to the appropriate signal by the PAL module of the wireless image sensor. Typical signal used is the CC signal as defined in the Camera Link standard.

The next event 702 consists in ending the sensor exposure. This is usually decided by the robot controller. The robot controller sends a second control packet dedicated to ending the exposure. The control packet is converted into appropriate electrical signal by the PAL module of the wireless image sensor. However the sensor can also be configured to stop the exposure by itself after a duration defined at initialization. Also the camera can be set dynamically to wait for the robot control instruction or to decide by itself about when to stop the exposure. The step from 701 to 702 is called Sensor Exposure. It corresponds to the actual acquisition of data by the sensor.

The next event 703 after the end of the sensor exposure is the start of an image event from the sensor. Usually this event is reflected by the electrical signal Fval from the Camera Link Standard in the described embodiment. The step between the 702 and 703 is often called pixel readout and its duration can be found in the sensor's data sheet. This step depends on each sensor and also about the clock frequency set to the sensor. This step consists in converting the pixel values from the analog domain to the digital domain.

The next event 704 is the actual delivery of the first pixel from the sensor to the PAL module. The time between 703 and 704 is called the Horizontal Blanking and is defined by the image format. The last event 705 is image block ready for transmission. The time between 704 and 705 is spent in pixel data buffering in the PAL module. The duration depends on the ratio between the sensor throughput and the wireless network throughput and the defined wireless network packet size.

The values of duration indicated in FIG. 7 are representative of a typical image sensor and are given here only as illustration.

To compute the prediction time, some information has to be gathered in the wireless image sensor MAC module to perform a prediction of image block ready for transmission in the described embodiment.

In this embodiment, the prediction time is given by the following formula:

Prediction time=reception time of control packet 1 (701)+Sensor exposure+Pixel readout+Horizontal blanking+Pixel buffering.

The value of Sensor Exposure may be set by the CPU through the peripheral interface at initialization time. It can be set to a typical value, or it can be set to a value sent by the robot controller in a control packet. This value shall be understood as a reference value that may be revised during the prediction update as described in FIG. 8.

The value of Pixel Readout may set by the CPU through the peripheral interface at initialization time. This value is typically a constant depending on the sensor and known from the sensor manufacturer. It is usually given in the sensor's datasheet.

The value of horizontal blanking depends on the image format configured by the robot controller in a control packet. It may be set by the CPU through the peripheral interface each time the image format changes.

The value of the Pixel Buffering is dynamically calculated following the formula: Buffering time=Packet size*(1/Camera throughput−1/Network throughput) if the Camera throughput is less than the network throughput otherwise there is no need for pixel buffering and the buffering time is set to 0.

The packet size is obtained at step 605 of FIG. 6, the Camera and network throughput are set by the CPU through the peripheral interface at initialization time.

Figure 8:
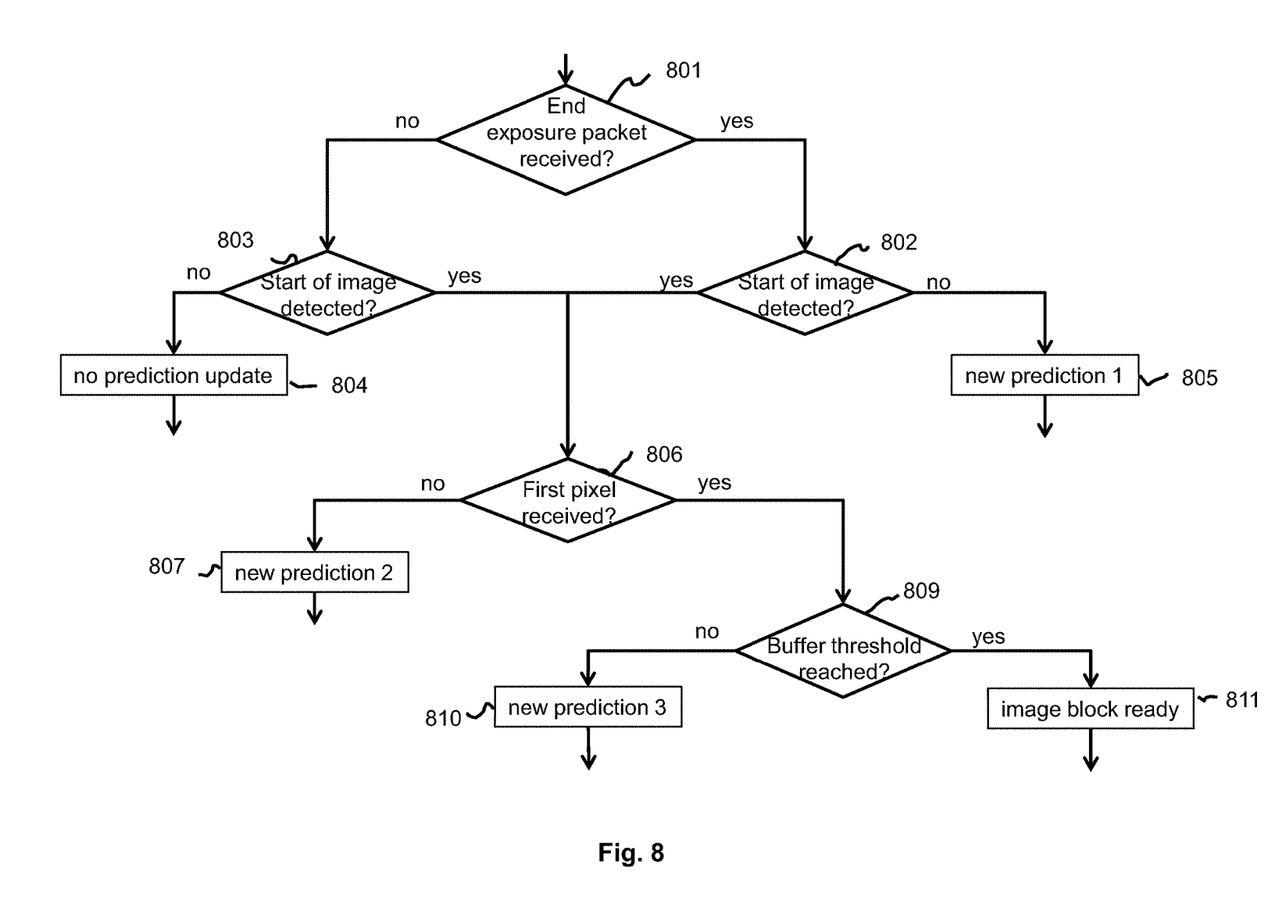
FIG. 8 illustrates an embodiment of the algorithm followed by the wireless image sensor MAC module 305 for updating the prediction.

FIG. 8 illustrates an embodiment of the algorithm followed by the wireless image sensor MAC module 305 for updating a previous prediction time.

In an initial step 801 the MAC module checks if an end of exposure control packet has been already received from the robot controller. In embodiments where the sensor determines itself the end of exposure, for example from a parameter or dynamically based on external parameters like the ambient light, the occurrence of this end of exposure is determined.

If yes then during the test 802 the MAC module checks if a start of image signal have been already detected in the PAL module. If no then during the step 805 the MAC module updates it prediction by the formula:

New prediction=reception time of control packet 2 (702)+Pixel readout+Horizontal blanking+Pixel buffering.

Back to the test 801, if the end of exposure commands was not received then during the test 803 the MAC module checks if a start of image is detected by the PAL module. If no then during the step 804 the MAC module returns the previous prediction.

From tests 803 and 802, if a start of image is detected in the PAL module then the MAC module executes the test 806.

During the test 806 the MAC module checks if the first pixel has been already received in the PAL module.

If it is not yet received then during the step 807 the MAC module returns a prediction following the formula:

New prediction=detection time of start of image in PAL (703)+Horizontal blanking+Pixel buffering.

If the first pixel has been already received by the PAL module then the MAC module executes the test 809.

During the test 809 then MAC module checks if the pixel buffer of the PAL module stored already enough data for sending the first packet.

If the pixel buffer is not already filled with enough data then during the step 810, the MAC module sends an updated prediction following the formula:

Updated prediction=detection time of the first pixel arrived in the PAL (704)+Pixel buffering.

If the pixel buffer is already filled with enough data then there is no more need for prediction, the image block is ready for transmission, so during the step 811 the MAC module return the current time.

Any step of the algorithm shown in FIGS. 5, 6 and 8 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for transmitting data from a slave node to a master node in a robotic control network, the robotic control network being based on a shared transmission channel, access to the shared transmission channel being scheduled by the master node, the slave node comprising an acquisition device producing the data, the method comprising on the slave node:
   obtaining a request from the master node for acquiring data;
   estimating the value of a time information representative of a delay for the acquisition device to acquire a block of data ready for transmission to the master node;
   sending a message to the master node comprising the estimated time information value;
   receiving, from the master node, an authorization of transmission of the block of data from the slave node to the master node, the authorization of transmission scheduling an access time for transmitting the block of data, wherein the scheduled access time depends on the estimated time information value and wherein the estimating of the value of the time information by the slave node is performed prior the receiving of the authorization of transmission from the master node; and
   transmitting the block of data from the slave node to the master node during the scheduled access time after the receiving of the authorization of transmission of the block of data.

2. The method of claim 1, further comprising:
   estimating an updated value of the time information;
   sending a message to the master node comprising the updated estimated time information; and
   receiving an updated authorization of transmission from the master node, the updated authorization of transmission being scheduled at a time depending on the updated estimated time information.

3. The method of claim 1, wherein estimating the value of a time information representative of a delay for the acquisition device to acquire a block of data ready for transmission comprises:
   estimating the actual acquisition of data by the acquisition device;

estimating the time for converting acquired values from the analog domain to the digital domain;

estimating the time of the actual delivery of data to a module responsible for packing the data into a format suitable for the network transport; and estimating the time for data buffering in the module responsible for packing the data.

4. The method of claim 2, wherein estimating the value of a time information representative of a delay for the acquisition device to acquire a block of data ready for transmission comprises:

estimating the actual acquisition of data by the acquisition device;

estimating the time for converting acquired values from the analog domain to the digital domain;

estimating the time of the actual delivery of data to a module responsible for packing the data into a format suitable for the network transport; and estimating the time for data buffering in said module responsible for packing the data.

5. A method for transmitting data from a slave node to a master node in a robotic control network, the robotic control network being based on a shared transmission channel, access to the shared transmission channel being scheduled by the master node, the slave node comprising an acquisition device producing the data, the method comprising on the master node:

obtaining a message from the slave node comprising an estimate, calculated by the slave node, of the value of a time information representative of a delay for the acquisition device to acquire a block of data ready for transmission to the master node;

determining an authorization of transmission of the block of data, the authorization of transmission scheduling an access time for transmitting the block of data, wherein the scheduled access time depends on the received estimated time information value;

sending the authorization of transmission to the slave node after the slave node calculates the estimated time information value; and obtaining the block of data from the slave node during the scheduled access time, after the slave node receives the authorization of transmission, according to the sent authorization of transmission.

6. The method of claim 5, further comprising:

obtaining a message from the slave node comprising an updated time information;

determining an updated authorization of transmission scheduled at a time depending on the updated time information; and sending the updated authorization of transmission to the slave node.

7. A device acting as a slave node for transmitting data to a master node in a robotic control network, the robotic control network being based on a shared transmission channel, access to the shared transmission channel being scheduled by the master node, the slave node comprising an acquisition device producing the data, the device comprising a processing device configured for carrying out the steps of:

obtaining a request from the master node for acquiring data;

estimating the value of a time information representative of a delay for the acquisition device to acquire a block of data ready for transmission to the master node;

sending a message to the master node comprising the estimated time information value;

receiving, from the master node, an authorization of transmission of the block of data from the slave node to the master node, the authorization of transmission scheduling an access time for transmitting the block of data, wherein the scheduled access time depends on the estimated time information value and wherein the estimating of the value of the time information by the slave node is performed prior to the receiving of the authorization of transmission from the master node; and transmitting the block of data from the slave node to the master node during the scheduled access time after the receiving of the authorization of transmission of the block of data.

8. The device of claim 7, wherein the processing device is further configured for carrying out the steps of:

estimating an updated value of the time information;

sending a message to the master node comprising the updated estimated time information; and receiving an updated authorization of transmission from the master node, the updated authorization of transmission being scheduled at a time depending on the updated estimated time information.

9. The device of claim 7, wherein the processing device is further configured for carrying out the following steps for estimating the value of a time information representative of a delay for the acquisition device to acquire a block of data ready for transmission:

estimating the actual acquisition of data by the acquisition device;

estimating the time for converting acquired values from the analog domain to the digital domain;

estimating the time of the actual delivery of data to a module responsible for packing the data into a format suitable for the network transport; and estimating the time for data buffering in the module responsible for packing the data.

10. The device of claim 8, wherein the processing device is further configured for carrying out the following steps for estimating the value of a time information representative of a delay for the acquisition device to acquire a block of data ready for transmission:

estimating the actual acquisition of data by the acquisition device;

estimating the time for converting acquired values from the analog domain to the digital domain;

estimating the time of the actual delivery of data to a module responsible for packing the data into a format suitable for the network transport; and estimating the time for data buffering in the module responsible for packing the data.

11. A device acting as a master node for receiving data from a slave node in a robotic control network, the robotic control network being based on a shared transmission channel, access to the shared transmission channel being scheduled by the master node, the slave node comprising an acquisition device producing the data, the device comprising a processing device configured for carrying out the steps of:

sending a request for acquiring data to the slave node;

obtaining a message from the slave node comprising an estimate, calculated by the slave node, of the value of a time information representative of a delay for the acquisition device to acquire a block of data ready for transmission;

determining an authorization of transmission of the block of data, the authorization of transmission scheduling an access time for transmitting the block of data, wherein the scheduled access time depends on the received estimated time information value;

sending the authorization of transmission to the slave node after the slave node calculates the estimated time information value; and obtaining the block of data from the slave node during the scheduled access time, after the slave node receives the authorization of transmission, according to the sent authorization of transmission.

12. The device of claim 11, wherein the processing device is further configured for carrying out the following steps:

obtaining a message from the slave node comprising an updated time information;

determining an updated authorization of transmission scheduled at a time depending on the updated time information; and sending the updated authorization of transmission to the slave node.

\* \* \* \* \*